US012272918B1

(12) United States Patent
King

(10) Patent No.: US 12,272,918 B1
(45) Date of Patent: Apr. 8, 2025

(54) HAND-MANIPULATED TOOL FOR ASSEMBLING SOLAR ELECTRICAL CONNECTORS

(71) Applicant: Kevin King, Meridian, ID (US)

(72) Inventor: Kevin King, Meridian, ID (US)

( * ) Notice: Subject to any disclaimer, the term of this patent is extended or adjusted under 35 U.S.C. 154(b) by 0 days.

(21) Appl. No.: 18/777,429

(22) Filed: Jul. 18, 2024

(51) Int. Cl.
*H01R 43/22* (2006.01)

(52) U.S. Cl.
CPC .................................... *H01R 43/22* (2013.01)

(58) Field of Classification Search
CPC ....... H01R 43/22; B25B 13/06; B25B 13/065; B25B 13/48; B25B 13/08
USPC ............................................................ 29/764
See application file for complete search history.

(56) References Cited

U.S. PATENT DOCUMENTS

| | | | | |
|---|---|---|---|---|
| 6,637,298 | B1 * | 10/2003 | O'Brien | B25B 13/102 81/185 |
| 6,887,102 | B1 * | 5/2005 | Burris | H01R 24/40 439/578 |
| 8,353,229 | B1 | 1/2013 | Muhareb | |
| 10,239,191 | B2 | 3/2019 | Tan | |
| 11,731,247 | B2 | 8/2023 | Chen | |
| 2006/0117915 | A1 * | 6/2006 | Hui | B25B 13/102 81/121.1 |
| 2007/0298653 | A1 * | 12/2007 | Mahoney | H01R 24/542 439/578 |
| 2022/0226967 | A1 | 7/2022 | Edmonds et al. | |
| 2024/0079837 | A1 | 3/2024 | Bingham et al. | |
| 2024/0079838 | A1 | 3/2024 | Dahan | |
| 2024/0139914 | A1 | 5/2024 | Fuentes | |

FOREIGN PATENT DOCUMENTS

| | | | |
|---|---|---|---|
| AU | 2010101368 | A4 | 1/2011 |
| CN | 209615331 | U | 11/2019 |
| CN | 209919759 | U | 1/2020 |

(Continued)

OTHER PUBLICATIONS

1 Pair Solar Connector Tool Assembly Spanner | Quick Disconnect For Solar Panel Cables & Connectors, ShopSolar. com, Los Vegas, Nevada, Downloaded from the Internet from: https://shopsolarkits.com/products/solar-connector-tool on Jun. 3, 2024.

(Continued)

*Primary Examiner* — Livius R. Cazan
(74) *Attorney, Agent, or Firm* — Stone Creek Services LLC; Alan M Flum

(57) ABSTRACT

An electrical connector installation tool for electrical connectors that include a main body and a screw-on end cap. The electrical connector installation tool includes a separate end cap tool and main body tool. The end cap tool and the main body tool may be structured to be hand gripped and hand turned around the tool body. To accommodate different electrical connectors of different sizes or different types, the end cap tool may include a pair of end cap sockets positioned on opposite ends of a hollow interior within the end cap tool. The end cap sockets may be sized and shaped to receive and turn screw-on end caps of different sizes. For example, one end cap socket could be sized and shaped to accommodate MC4 electrical connectors while the other end cap socket could accommodate H4 electrical connectors with larger screw-on end caps.

13 Claims, 15 Drawing Sheets

(56) References Cited

FOREIGN PATENT DOCUMENTS

| | | | |
|---|---|---|---|
| CN | 211278178 | U | 8/2020 |
| CN | 217860997 | U | 11/2022 |
| CN | 218194873 | U | 1/2023 |
| CN | 218648485 | U | 3/2023 |
| CN | 219747780 | U | 9/2023 |

OTHER PUBLICATIONS

Solarline Catalog, Multi-Contact MC, pp. 62 and 63, Jul. 2015, Staubli Group, Allschwil, Switzerland.

Tools and accessories, Renewable Energy | Solar Photovoltaics, p. 23, (Socket wrench insert), Feb. 2024, Staubli International AG, Allschwil Switzerland.

Stabuli TBH Zonn PV-WZ-AD-GWD 32-6006, BengShop, downloaded from the Internet from https://www.bengshop.nl/staubli-tbh-zonn-pv-wz-ad-gwd-32-600632-6006-art/ on Jun. 6, 2024.

Solar Line Photovoltaic Interconnection System, ICS 18-11, p. 34, Aug. 2017, Amphenol Industrial Solar Technologies.

TE Connectivity SolarLok PV4 Connector, 4-1773464-8 CIS WR Nov. 2012, Nov. 2012, Tyco Electronics Corporation.

Solar Serpent 5-in-1 Multipurpose Solar Connector Tool, Rack-A-Tiers Specialty Electronics, Victoria, BC, Canada, downloaded from the Internet from https://rack-a-tiers.com/product/solar-serpent/ on Jul. 7, 2024.

D33-N52 Specification Sheet, Jun. 2024, K&J Magnetics, Inc., Pipersville, PA.

T4 PV Connector Installation Manual, EN-Rev IM-TC-EN/1.5, Apr. 2020, Tlian (Changshu) Co., Ltd., Changshu, China.

* cited by examiner

HAND-MANIPULATED TOOL FOR ASSEMBLING SOLAR ELECTRICAL CONNECTORS

BACKGROUND

This disclosure is in the field of metal working and relates to a tool for assembling electrical devices. Specifically, this disclosure relates to a tool for assembling electrical connectors. The tool comprises a hand-manipulatable implement.

SUMMARY

Single-conductor electrical connectors, used for conducting electricity, for example, in photovoltaic systems, typically include a male connector that mates to a female connector. These electrical connectors are available in several different types, for example MC4, H4, or T4 type electrical connectors. The male and female connectors may typically include a main body, a metal crimp contact pin, an elastomeric water seal, and a screw-on end cap. Installers may use hand tools, such as a specialized electrical connector spanner wrench, or power tools, such as an impact hammer with a specialized socket, to install the screw-on end cap to the main body.

The Inventor observed that installers may overtighten and damage the screw-on end cap or main body during installation using the conventional tools listed above. The Inventor discovered that the structure of conventional electrical connector spanner wenches causes the installer to hold the tool in such a way that does not provide sufficient tactile feedback to prevent overtightening. This can be exasperated by the moment arm of the spanner wrench's handle, which can provide too much torque. He also observed that using these tools can be awkward. For example, typically, securing the screw-on end cap to the main body requires two instances of an electrical connector spanner wrench, one to hold the screw-on end cap, and the other to grasp the main body of the electrical connector. Since this occupies both of the installer's hands, it is challenging to tighten the screw-on end cap to the main body and at the same time, hold the electrical wire so that it does not move or come loose from the screw-on end cap. This problem can be made worse by low clearance between the installed solar panels and the roof. In addition, the Inventor observed that installers may misplace the installation tools, which can be inconvenient, especially when the installation is on a roof and spare tools are on the ground. The Inventor also envisioned developing a simple tool that could work with more than one type of solar electrical connector.

The Inventor developed an electrical connector installation tool that solves the above-mentioned problems. The electrical connector installation tool includes an end cap tool and main body tool. The end cap tool seats and captures an electrical connector screw-on end cap, so it can be turned. The main body tool seats and captures the main body of the electrical connector. The end cap tool and the main body tool may be structured to be hand gripped and hand turned around the outside of their respective tool bodies. The end cap tool and main body tools may be structured to be hand gripped co-axially around their respective tool bodies and the respective screw on-end cap or main body of the electrical connector. This arrangement provides greater tactile feedback and helps prevent the installer from overtightening the screw-on end cap. The Inventor's electrical connector installation tool can also be easier for installers to assemble the electrical connectors under solar panels. One of the installer's hands can firmly grip both the end cap tool and the electrical wire preventing the electrical wire from moving, twisting, or coming loose. The installer's other hand grips the main body tool. An installer can easily maneuver the end cap tool and main body tool where there is low-clearance. This is because only their hands and the compact screw-on end cap and main body tools need to clear the space between the roof and the bottom of the solar panels.

To accommodate different solar electrical connectors of different sizes or different types, the end cap tool may include a pair of end cap sockets positioned on opposite ends of a hollow interior within the end cap tool. The first of the end cap sockets may be co-axial with the second of the end cap sockets. The end cap sockets are sized and shaped to receive and turn screw-on end caps of two different sizes. For example, one end cap socket could be sized and shaped to accommodate MC4 connectors while the other end cap socket could accommodate H4 electrical connectors. In order to feed the electrical wire extending from the end cap of the electrical connector, the end cap tool may include a slot-shaped opening extending from the outside surface of the end cap tool into its hollow interior. One or both of the end cap sockets may be fluted to receive fluted end caps.

The end cap tool and the main body tool may be structured to magnetically connect. This reduces the risk of misplacing the tools. The main body tool and the end cap tool may include magnets extending into the top of the end cap tool and the top of the main body tool, respectively. The magnetics within the end cap tool may be aligned with the magnets of the main body tool. This allows the end cap tool and the main body tool to secure to one another even if their respective tool bodies are made of a non-magnetic material such as aluminum, high-nickel stainless steel, brass, or plastic.

In order to help facilitate hand gripping around the body of the end cap as described above, the end cap tool may comprise a slotted tube. This slotted tube may be sized and shaped to be hand gripped around the outside of the tube. Similarly, the main body tool may comprise a tube. The Inventor found that a hexagonally-shaped outside surface of the end cap tool or the main body tool helps accommodate hand gripping when sized appropriately. For example, the outer, middle, and inner portion of several fingers (i.e., the distal, middle, and proximal phalanxes) can grip three sides of the hexagonal shape. The fleshy portion between the thumb and index finger (i.e., the thenar) can grip two sides of the hexagonal shape. The lower portion of the thumb (i.e., proximal phalanx of the thumb) can grip the remaining side.

This Summary includes a select set of features and advantages of the electrical connector installation tool. Some of these features may be optional. The examples in this Summary are a sampling of what is possible and do not limit the claims.

DETAILED DESCRIPTION

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not exclude unrecited elements.

The Detailed Description includes the following sections: "Definitions," "General Discussion," "Assembly Example," and "Conclusion and Variations."

Definitions

Tube: As defined in this disclosure, a tube is a hollow section with a length and two ends. The tube may be cylindrical or non-cylindrical. For example, a tube may include a circular cross section (i.e., a cylindrical tube), an elliptical cross section, a rectangular cross section, a hexagonal cross section, a pentagonal cross section or may have a cross section of other closed polygons, curved, or combination of piece-wise curved and polygonal shapes. A slotted tube refers to a tube with a slot or slot-shaped opening that extends along the body of the tube and through both ends of the tube.

General Discussion

Figure 1:
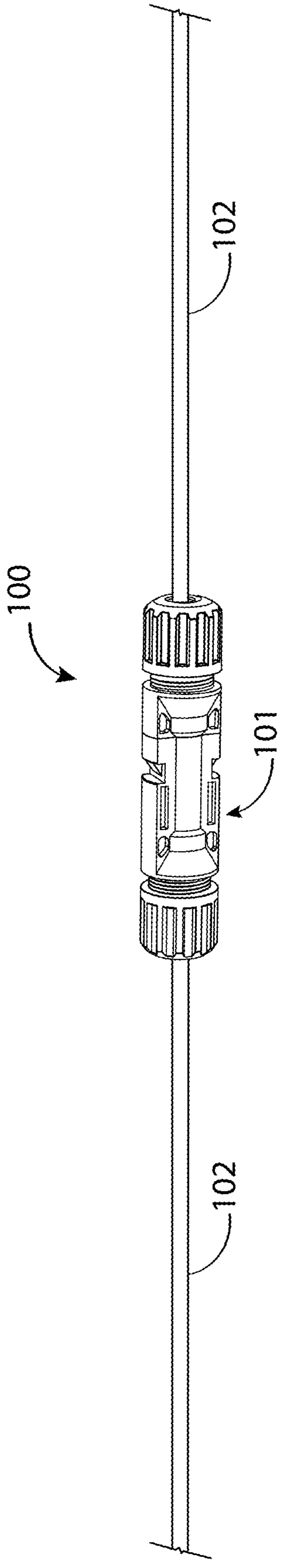
FIG. 1 illustrates, in front perspective view, an electrical connector assembly that includes an electrical connector plug and socket mating two electrical wires.
Figure 2:
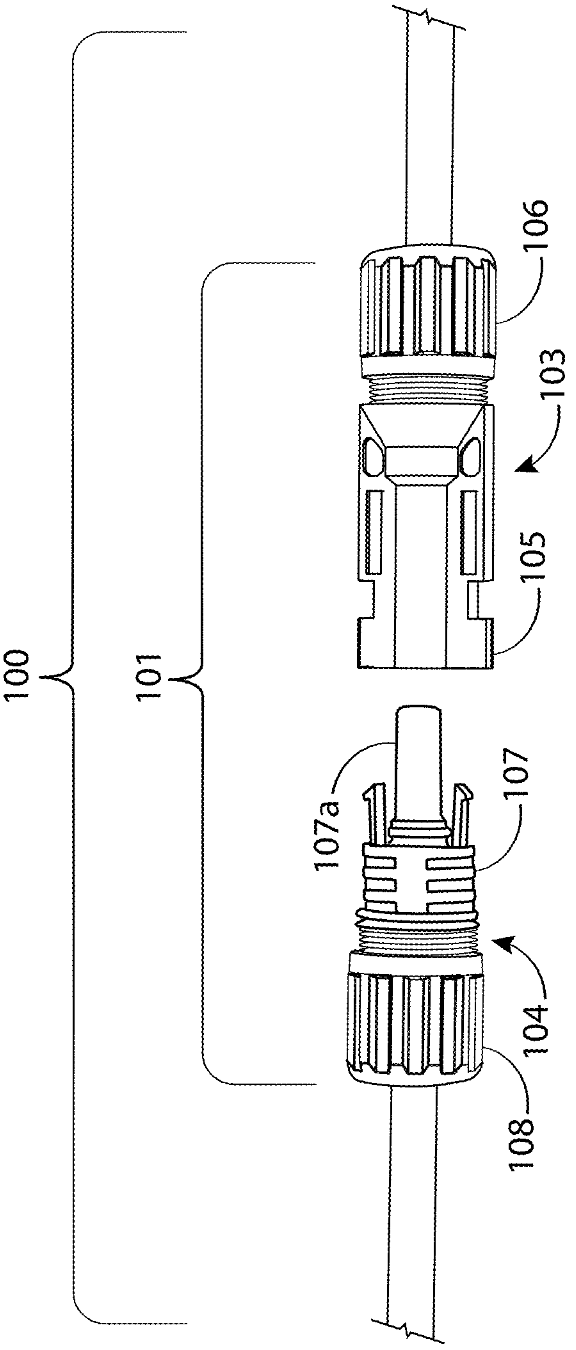
FIG. 2 illustrates, an enlarged view of the electrical connector assembly of FIG. 1 with the plug and socket disconnected.

Single-conductor electrical connectors, used for conducting electricity, for example, in photovoltaic systems, typically include a male connector that mates to a female connector. These electrical connectors are available in several different types, for example MC4, H4, or T4 type electrical connectors. FIG. 1 shows an example of an electrical connector cable assembly 100 with an electrical connector 101 and electrical wire 102. FIGS. 1 and 2 illustrate an example of an MC4-type electrical connector. Referring to FIGS. 1 and 2, the electrical connector 101 of the electrical connector cable assembly 100, includes male connector 103 and female connector 104 that mate together and form a watertight seal. Referring to FIG. 2, The male connector 103 includes a main body 105 and a screw-on end cap 106 that is threadedly fastenable to the main body 105. The female connector 104 includes a main body 107 and a screw-on end cap 108 that is threadedly fastenable to the main body 107. The male connector is so-called because it includes a male metal crimp contact pin that is shrouded within the main body 105. Likewise, the female connectors include a female metal crimp contact pin covered by a shroud 107*a* within the main body 107. Installers may use hand tools, such as a specialized spanner wrench, or power tools, such as an impact hammer with a specialized socket, to install the screw-on end cap to the main body.

Figure 3:
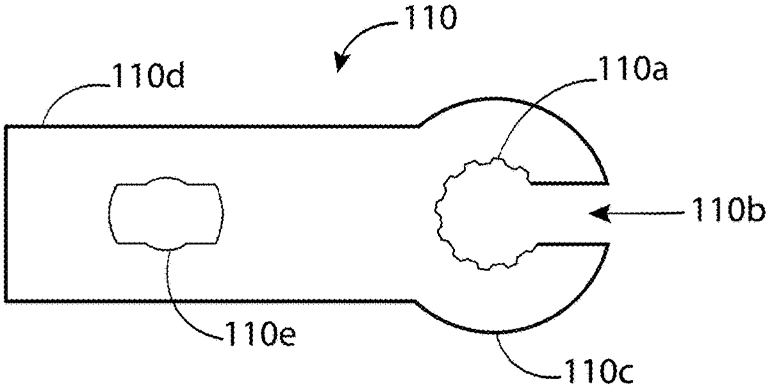
FIG. 3 PRIOR ART
FIG. 3 shows an MC4 spanner wrench embodying principles from the prior art.

FIG. 3 shows an MC4 spanner wrench 110, embodying principles from the prior art. The MC4 spanner wrench 110 includes a toothed aperture 110*a* that is sized and shaped to engage an MC4 connector screw-on end cap. A slot 110*b* extends from the outside 110*c* of the MC4 spanner wrench 110 into the toothed aperture 110*a*. The MC4 spanner wrench 110 includes an arm 110*d* that extends away from the toothed aperture 110*a*. The arm 110*d* includes a notched hole 110*e* that is sized and shaped to engage the main body 105 of the male connector from FIG. 2.

Figure 4:
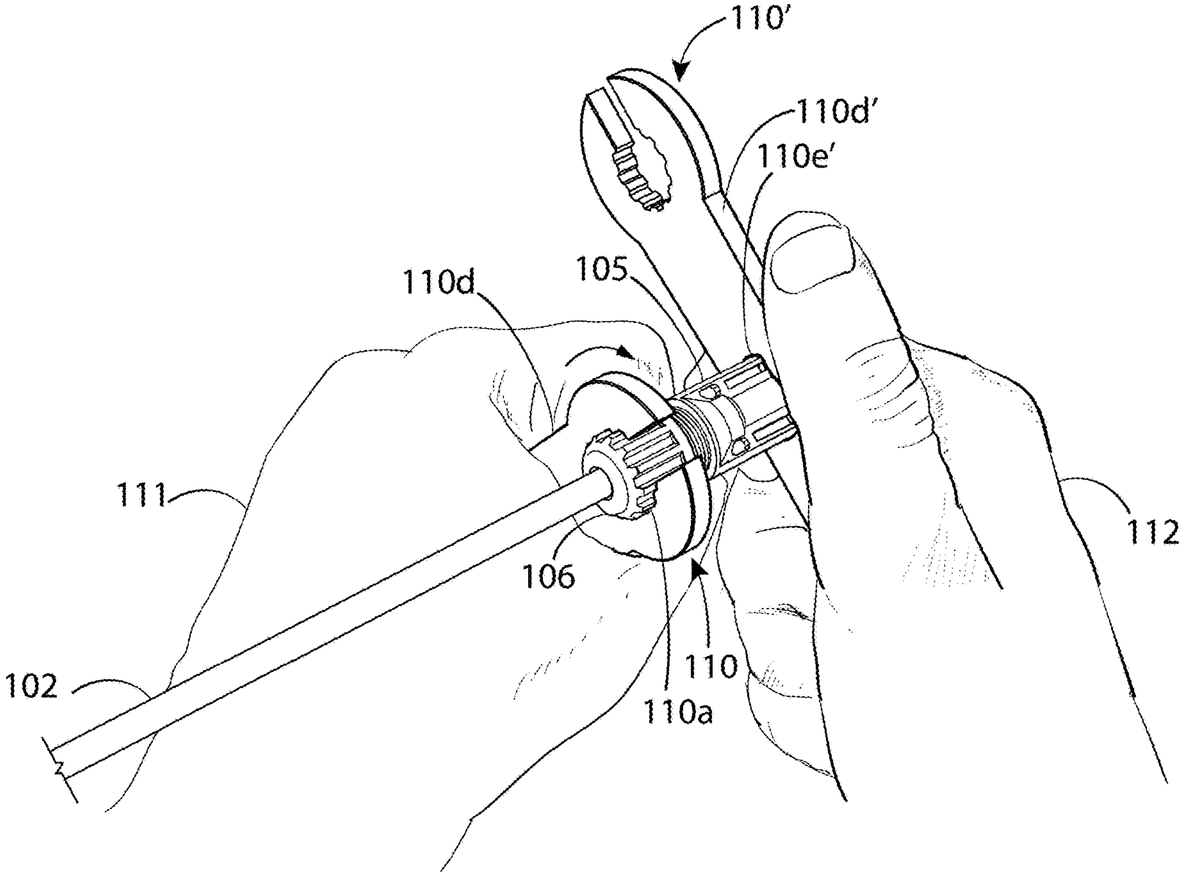
FIG. 4 PRIOR ART
FIG. 4, illustrates in perspective view, an installer using two instances of the MC4 spanner wrench of FIG. 3, to secure the screw-on end cap to the main body of the electrical connector of FIG. 1.

FIG. 4 illustrates how an installer would tighten the screw-on end cap 106 to the main body 105. FIG. 4 shows the installer engaging the screw-on end cap 106 with the toothed aperture 110*a* of a first instance of spanner wrench 110. The installer uses the notched hole 110*e*' of a second instance of the spanner wrench 110' to engage and hold the main body 105. The installer grasps and rotates the arm 110*d* of a first instance of the spanner wrench 110 with the left hand 111 to tighten the screw-on end cap 106. At the same time, the installer grasps and holds the arm 110*d*' of the second instance of spanner wrench 110' to prevent the main body 105 from moving as they tighten the screw with the right hand 112.

The Inventor observed that installers may overtighten and damage the screw-on end cap or main body during installation using conventional tools like the one shown in FIGS. 3 and 4. The Inventor observed that holding a conventional electrical wrench by a handle, such as spanner wrench 110 and arm 110*d*, which is perpendicular to the axis of rotation, does not provide sufficient tactile feedback to prevent overtightening. This can be exasperated by the moment arm of the spanner's wrench's handle, that can provide too much torque.

The Inventor also observed that using these tools can be awkward and could damage the electrical wire. For example, in FIG. 4, holding spanner wrench 110 and spanner wrench 110' requires two hands, as illustrated. An installer may find it difficult to hold spanner wrench 110 and 110' at a perpendicular angle to the electrical wire 102 and maintain pressure on the electrical wire 102 to prevent it from moving, twisting, or pulling loose. Excess movement or twisting of the electrical wire 102 can damage the electrical wire 102, damage the metal crimp contact pin within the main body 105, or pull the wire loose from the metal crimp contact pin. The other end of the electrical wire may be connected and secured. In that instance, excessive twisting or movement of the electrical wire 102 may also damage or pull the electrical wire 102 away from a metal crimp contact pin at the other end of the electrical wire 102. These problems can be made worse by low clearance between the installed solar panels and the roof.

In addition, the Inventor observed that installers may misplace the installation tools, which can be inconvenient, especially when the installation is on a roof and spare tools are on the ground. The Inventor also wanted to develop a simple tool that could work with more than one type of solar electrical connector.

Figure 5:
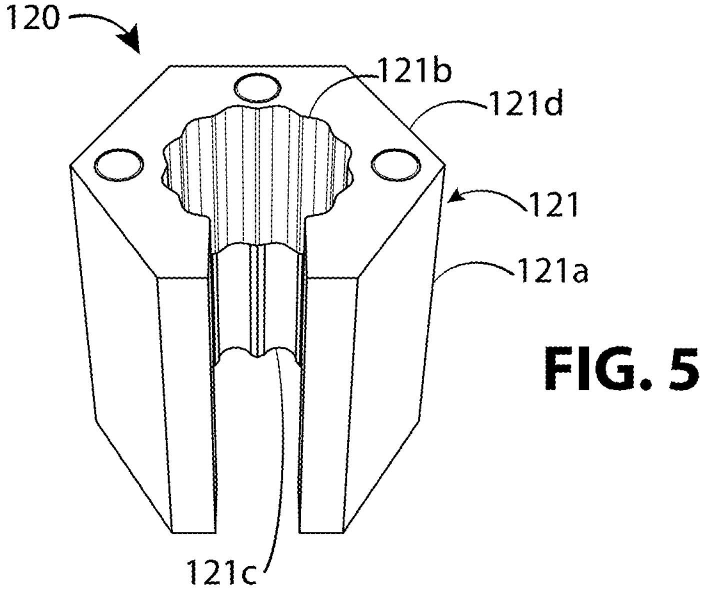
FIGS. 5 and 6 illustrate, in top front perspective view, and bottom front perspective view, respectively, an end cap tool of an electrical connector assembly tool of the present disclosure.
Figure 6:
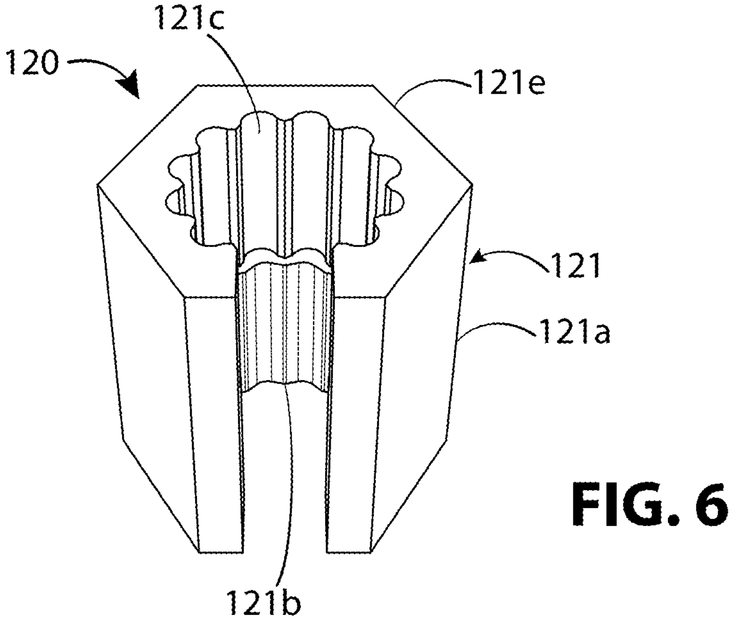
Figure 7:
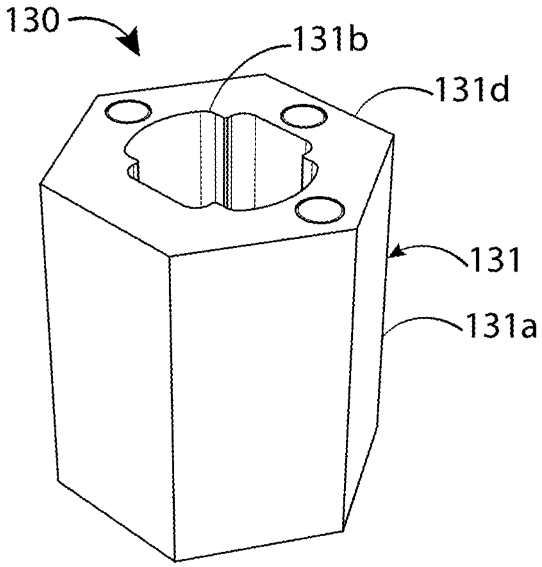
FIGS. 7 and 8 illustrate, in top front perspective view, and bottom front perspective view, respectively, a main body tool of an electrical connector assembly tool of the present disclosure.
Figure 8:
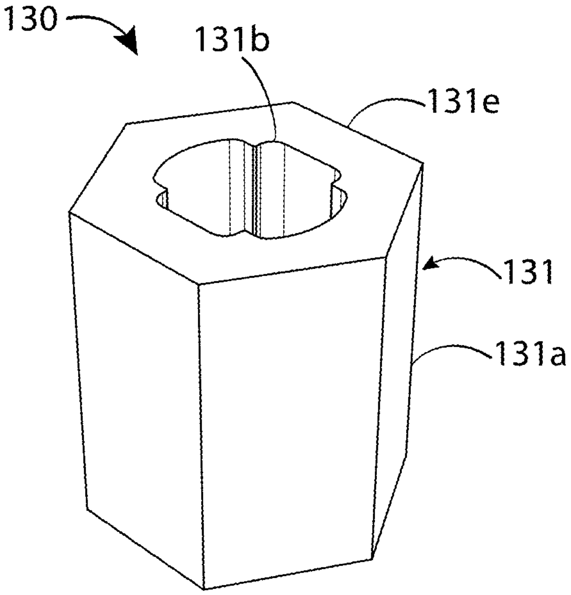

The Inventor developed an electrical connector installation tool that solves the above-mentioned problems. Referring to FIGS. 5-8, the electrical connector installation tool may include an end cap tool 120 (FIGS. 5 and 6) and a main body tool 130 (FIGS. 7 and 8), that is separate from the end cap tool 120. Referring to FIGS. 5 and 6, the end cap tool 120 includes an end cap tool body 121 structured to hold and turn a screw-on end cap of an electrical connector. Referring to FIGS. 7 and 8, the main body tool 130 includes a tool body 131 that may be structured to hold and turn the main body of an electrical connector. The end cap tool body 121 of FIGS. 5 and 6 and the tool body 131 of FIGS. 7 and 8 may be structured to hand grip around their outside peripheral surface, outside surface 121*a*, and outside surface 131*a*, respectively.

Figure 24:
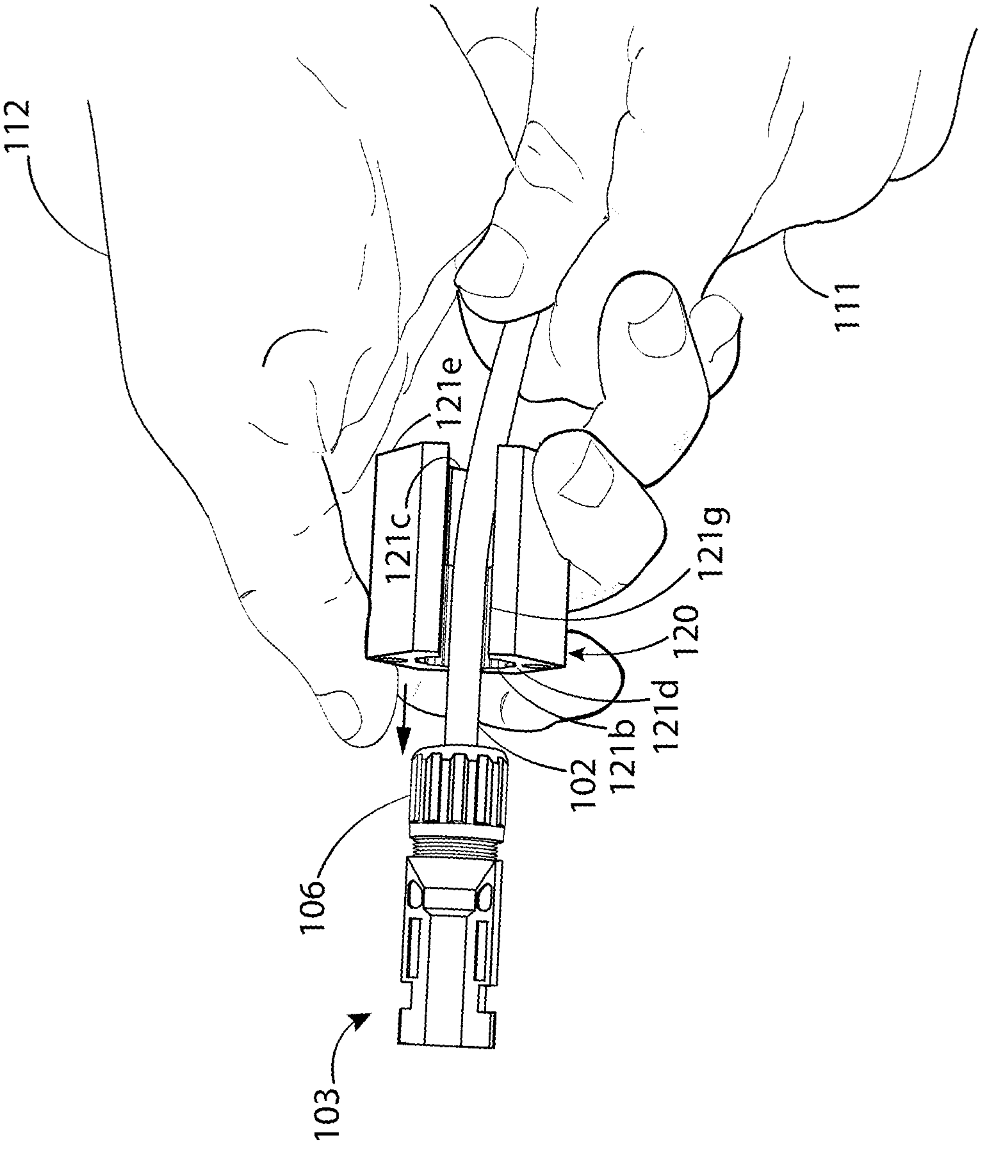
FIGS. 24-27 illustrate portions of a typical assembly sequence that use an electrical connector assembly tool of the present disclosure.
Figure 25:
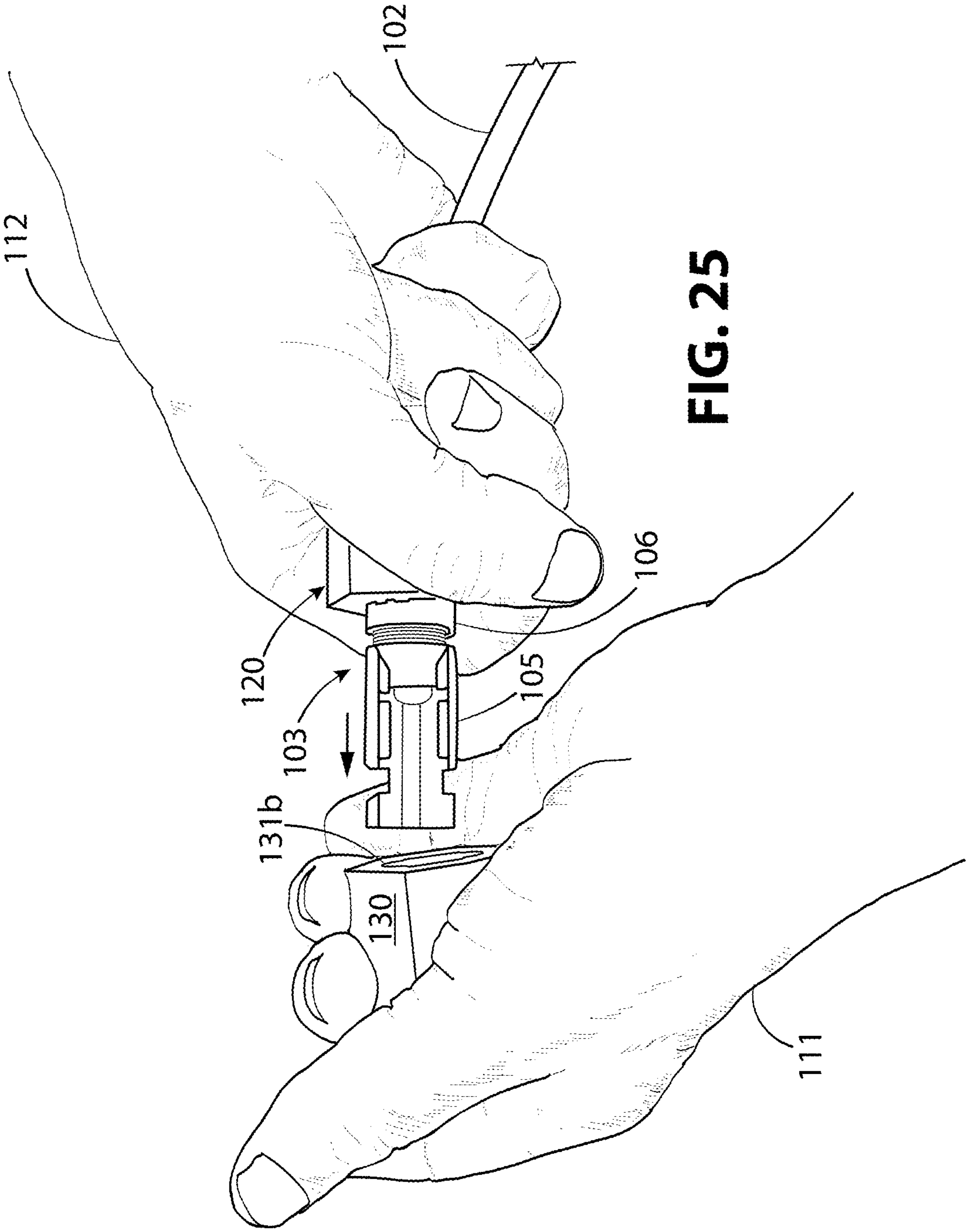
Figure 26:
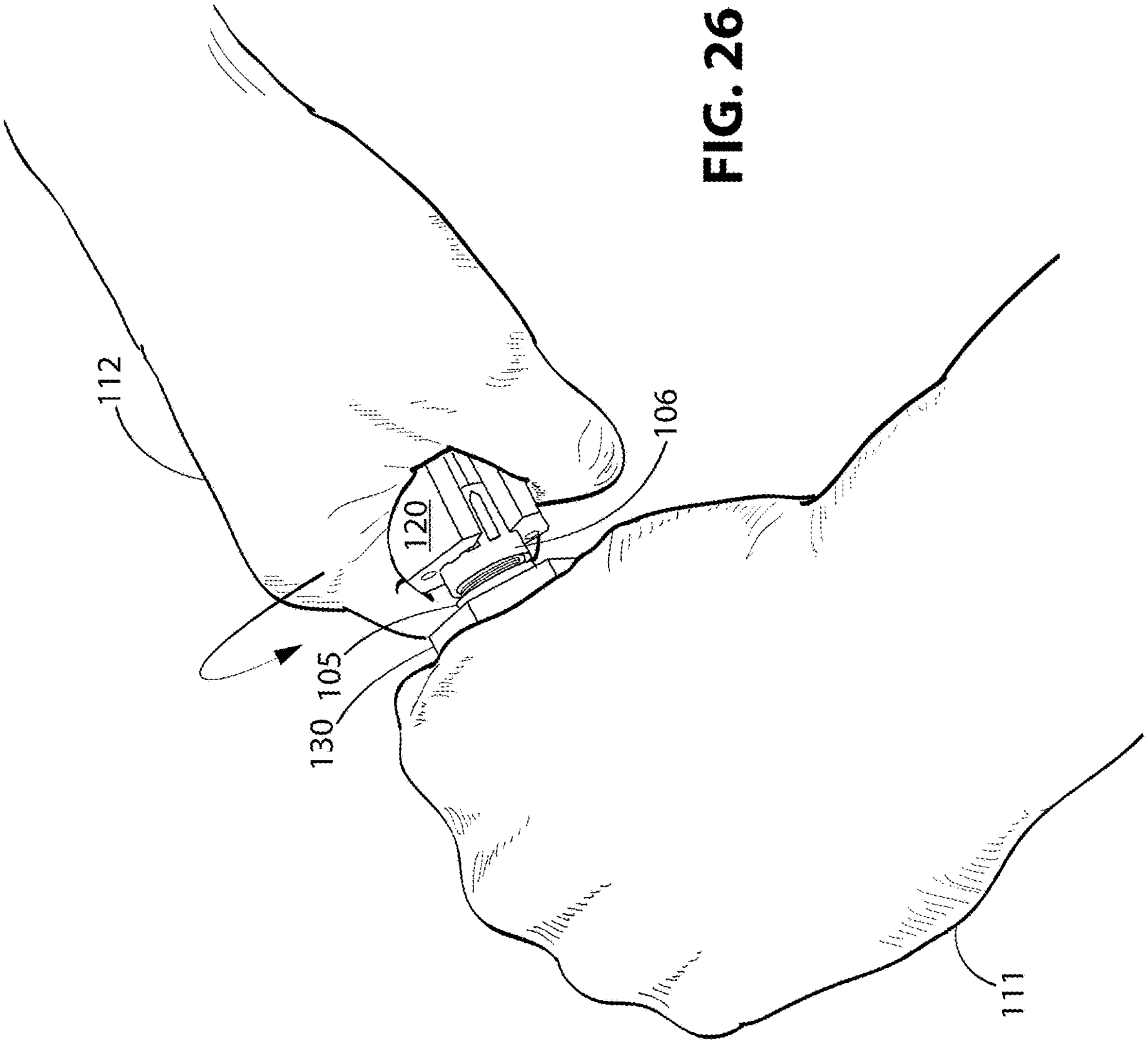

An example of how an installer may hand grip and assemble the screw-on end cap to the main body of an electrical connector will be discussed in detail for FIGS. 24-27. Referring to FIGS. 25 and 26, the end cap tool 120 and main body tool 130 are structured to be hand gripped around their respective outside surfaces and coaxially with the main body 105 and the screw-on end cap 106. This provides direct tactile feedback to the installer and therefore, there is less risk of overtightening. It also makes it easier for the installer to assemble the electrical connectors where there is low-clearance because the end cap tool 120 and main body tool 130 are held in line with the axis of rotation rather than held by a handle perpendicularly to the axis of rotation. The end cap tool 120 itself, will be discussed in detail for FIGS. 5, 6, and 9-14. The main body tool 130 will be discussed in detail for FIGS. 7, 8, 15, and 16.

Figure 9:
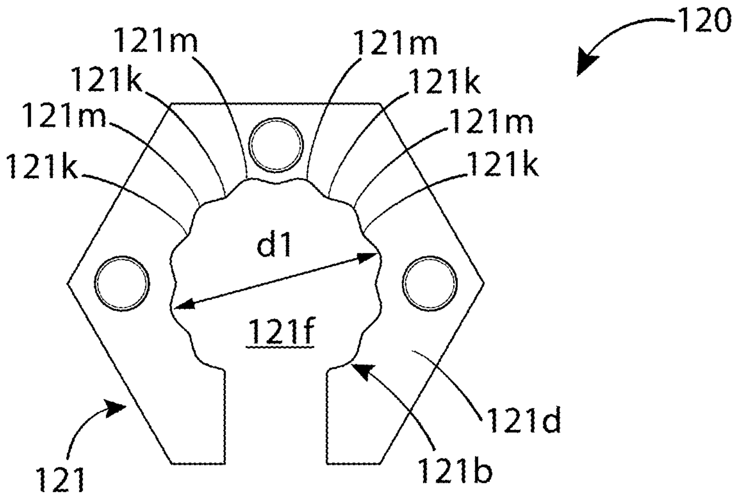
FIGS. 9 and 10 illustrate in top and bottom plan view, respectively, the end cap tool of FIG. 5.
Figure 10:
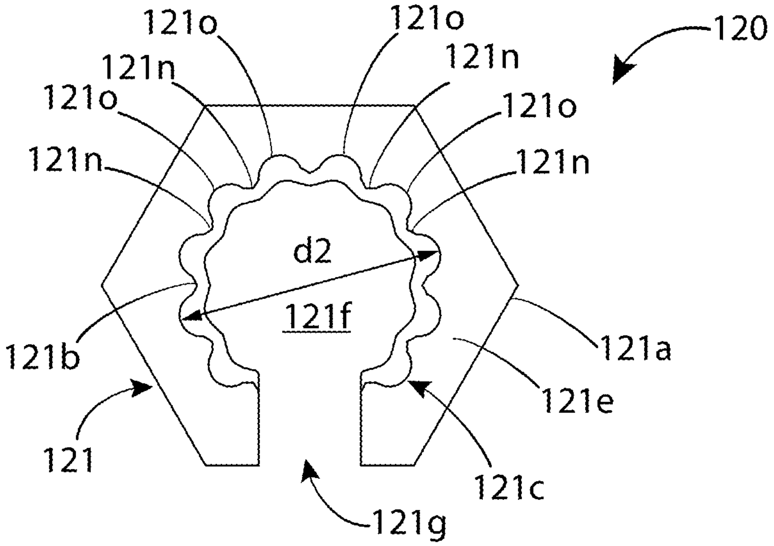
Figure 11:
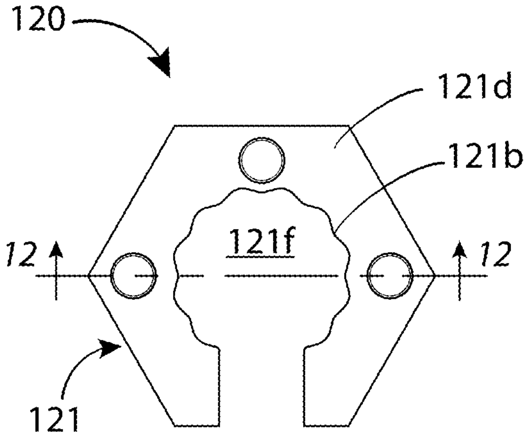
FIG. 11 illustrates in top plan view, the end cap tool of FIG. 5 showing section lines 12-12.
Figure 12:
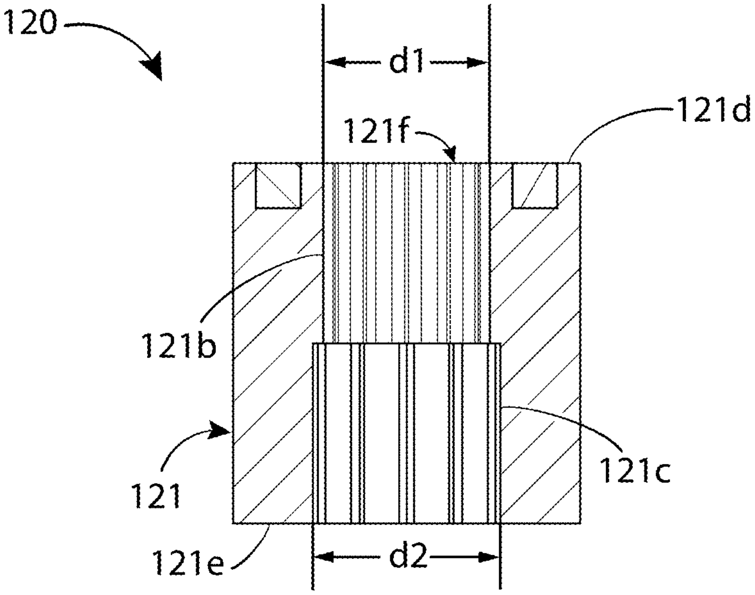
FIG. 12 illustrates a section view of the end cap tool of FIG. 5 taken along section lines 12-12 in FIG. 11.

Referring to FIGS. 5, and 6, to accommodate different solar electrical connectors of different sizes or different types, the end cap tool body 121 of the end cap tool 120 may include a pair of end cap sockets, for example, a first end cap socket 121*b* and a second end cap socket 121*c*. The sockets may be positioned on opposite ends of a hollow interior within the end cap tool 120. FIG. 5 illustrates the first end cap socket 121*b* extending into the top 121*d* of the end cap tool body 121. FIG. 6 illustrates the second end cap socket 121*c* extending into the bottom 121*e* of the end cap tool body 121. FIGS. 9-11 show the hollow interior 121*f*. FIGS. 9 and 11 illustrate the hollow interior 121*f* of end cap tool body 121, extending through the first end cap socket 121*b* and the top 121*d*. FIG. 10 illustrates the hollow interior 121*f* of end cap tool body 121 extending through the first end cap socket 121*b*, second end cap socket 121*c*, and the bottom 121*e*. FIG. 12 shows the hollow interior 121*f* of end cap tool body 121 extending through the first end cap socket 121*b*, second end cap socket 121*c*, top 121*d*, and bottom 121*e*.

Referring to FIGS. 10 and 12, the first end cap socket 121*b* may be co-axial with the second end cap socket 121*c*. The first end cap socket 121*b* and the second end cap socket 121*c* may be sized and shaped to receive and turn screw-on end caps of different sizes from one another. FIG. 9 illustrates the first end cap socket 121*b* with an opening measurement of distance d1. Distance d1 may be any dimension suitable for gripping and turning a corresponding screw-on end cap. For example, the first end cap socket 121*b* could be structured to be compatible with MC4-type or MC4-like connectors. Some MC4-type or MC4-like connectors may be compatible with distance d1 equal to approximately 19 mm. Other MC4-like or MC4-type connectors may require distance d1 equal to a larger or smaller dimension. FIG. 10 illustrates the second end cap socket 121*c* with an opening measurement of distance d2. Distance d2 may be any dimension suitable for gripping and turning a corresponding screw-on end cap. For example, the second end cap socket 121*c* could be structured to be compatible with H4-type or H4-like connectors. Some H4-type or H4-like connectors may be compatible with distance d2 equal to approximately 23 mm. Other H4-like or H4-type connectors may require distance d2 equal to a larger or smaller dimension.

Figure 13:
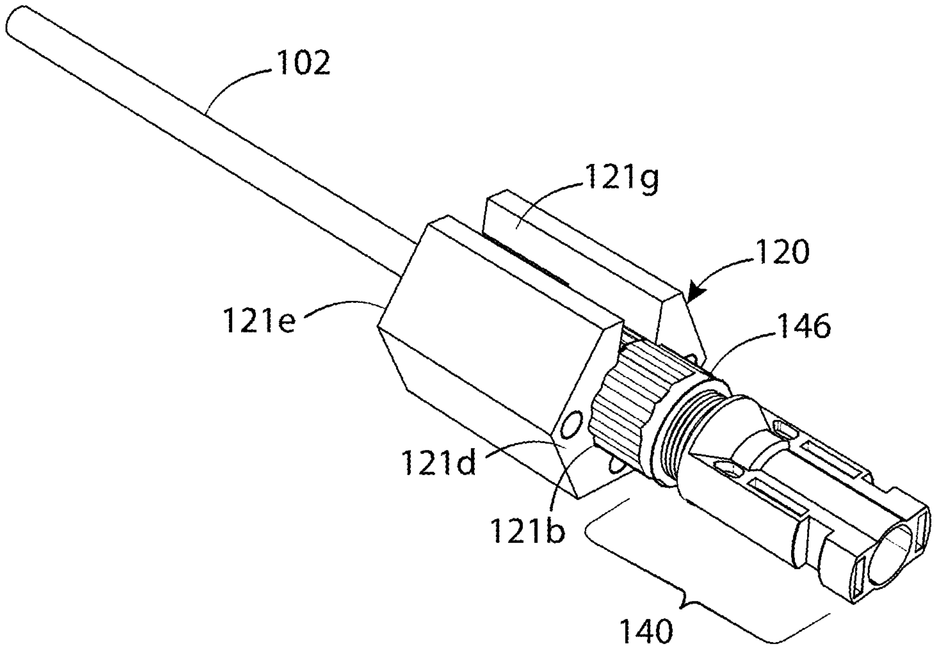
FIGS. 13 and 14 illustrate, in perspective view, the end cap tool of FIG. 5 engaging an MC4-type and H4-type electrical connector screw-on end cap, respectively.
Figure 14:
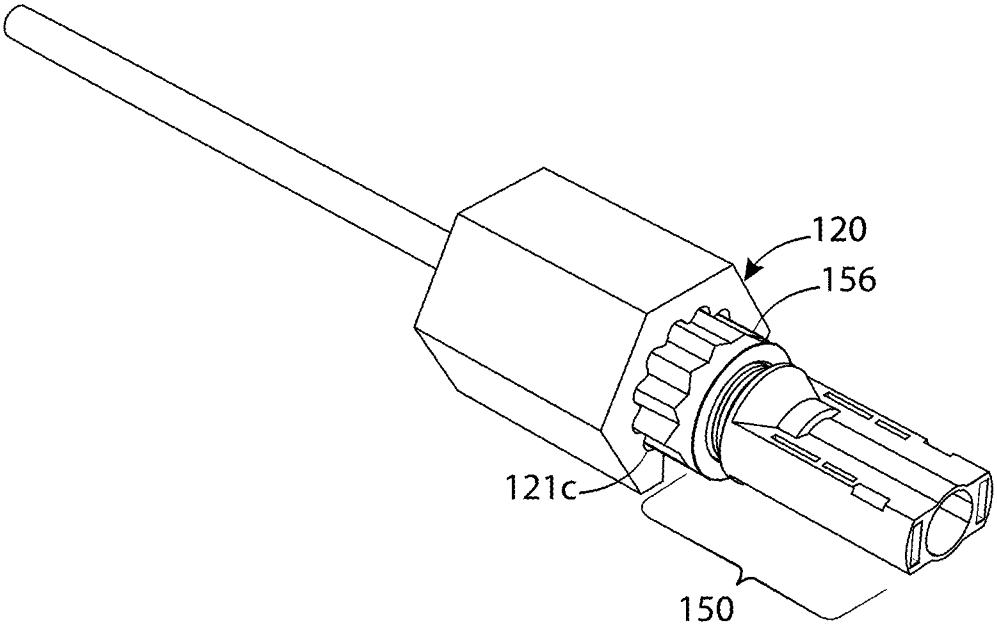

FIGS. 13 and 14 illustrate an example of how the different sizing of the first end cap socket 121*b* and the second end cap socket 121*c*, respectively, of the end cap tool 120 can be put to use. Referring to FIG. 13, the first end cap socket 121*b* may be sized and shaped to receive and turn a screw-on end cap 146 of an MC4 electrical connector 140, such as those developed by Stäubli International AG. Referring to FIG. 14, the second end cap socket 121*c* may be sized and shaped to receive and turn the end cap 156 of an H4 electrical connector 150, such as those developed by Amphenol Corporation.

Referring to FIG. 13, in order to feed the electrical wire 102 extending from the screw-on end cap 146 of the electrical connector 140, the end cap tool may include a slot-shaped opening 121*g* to pass through the electrical wire. Referring to FIG. 10, the slot-shaped opening 121*g* may extend from the outside surface 121*a* of the end cap tool 120 into the hollow interior 121*f*. Referring to FIGS. 13 and 24, the slot-shaped opening 121*g* may extend from the top 121*d* to the bottom 121*e*. This allows the electrical wire 102 to pass through both the second end cap socket 121*c* and first end cap socket 121*b*.

Referring to FIG. 10, one or both of the end cap sockets, first end cap socket 121*b* and second end cap socket 121*c*, may be fluted to screw-on end caps that are fluted, such as those shown in FIGS. 13 and 14. FIGS. 9 and 10 illustrate an example of how the first end cap socket 121*b* and the second end cap socket 121*c* could be fluted. Referring to FIG. 9, the first end cap socket 121*b* may include a first plurality of arc-shaped projections, i.e., instances of arc-shaped projection 121*k*, alternating with a first plurality of arc-shaped indented surfaces, i.e., instances of arc-shaped indented surface 121*m*. Referring to FIG. 10, the second end cap socket 121*c* may include a second plurality of arc-shaped projections, i.e., instances of arc-shaped projection 121*n*, alternating with a second plurality of arc-shaped indented surfaces, i.e., instances of arc-shaped indented surface 121*o*.

Figure 15:
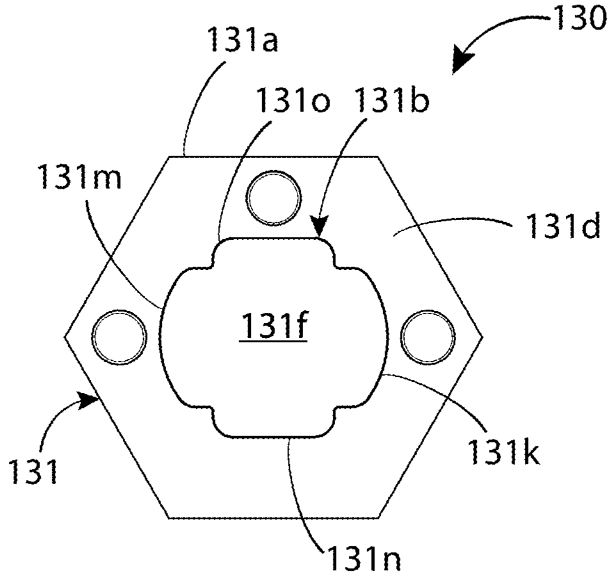
FIGS. 15 and 16 illustrate, in top and bottom plan view, respectively, the main body tool of FIG. 7.
Figure 16:
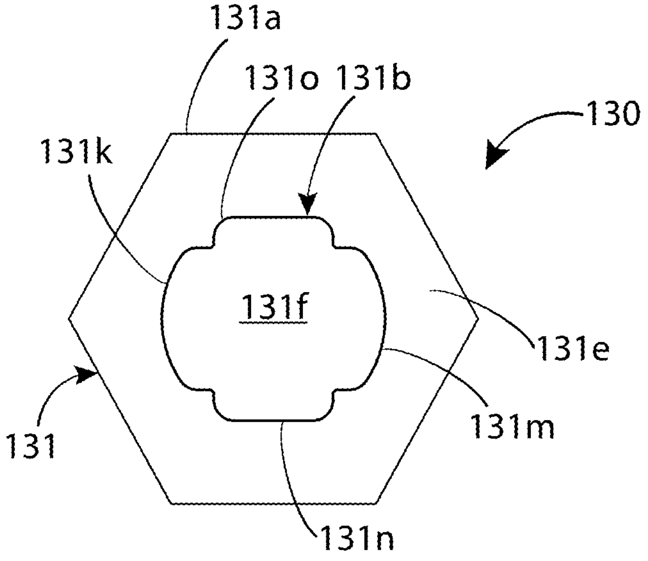

Referring to FIGS. 7, 8, 15 and 16, the tool body 131 of main body tool 130 includes a main body socket 131*b* that extends through the first end 131*d* (FIGS. 7 and 15) and the second end 131*e* (FIGS. 8 and 16). Referring to FIGS. 15 and 16, the main body socket 131*b* forms a hollow interior 131*f* of the tool body 131 of the main body tool 130. The hollow interior 131*f* (i.e., main body socket 131*b*) is sized and shaped to engage and hold the main body of the electrical connector. For example, the hollow interior 131*f* can include a first pair of keyways, keyway 131*k* and keyway 131*m* and a second pair of keyways, keyway 131*n* and keyway 131*o*. Keyway 131*k* and keyway 131*m* are indented into opposite sides of tool body 131. Keyway 131*n* and keyway 131*o* are indented into opposite sides of tool body 131 and are together perpendicularly positioned with respect to keyway 131*k* and 131*m*. Keyway 131*k* and keyway 131*m* include arcuate interior faces. Keyway 131*n* and keyway 131*o* include planar or flat interior faces with radiused corners. The above described configuration creates a shape that approximates the complementary shape of a typical solar electrical connector main body.

The hollow interior can engage the main body of the electrical connector though the first end 131*d* (FIG. 15) and through the second end 131*e* (FIG. 16). This is because the hollow interior 131*f* (i.e., the main body socket 131*b*) extends through both the first end 131*d* and the second end 131*e*.

Figure 17:
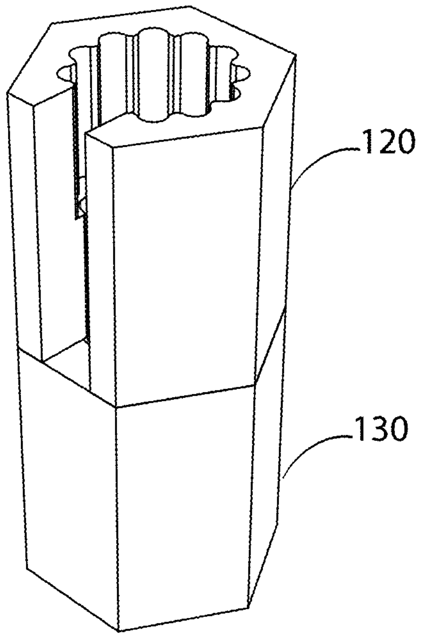
FIGS. 17 and 18 illustrate, in perspective view, the electrical connector assembly tool, with the end cap tool exploded away from the main body tool in FIG. 18.
Figure 18:
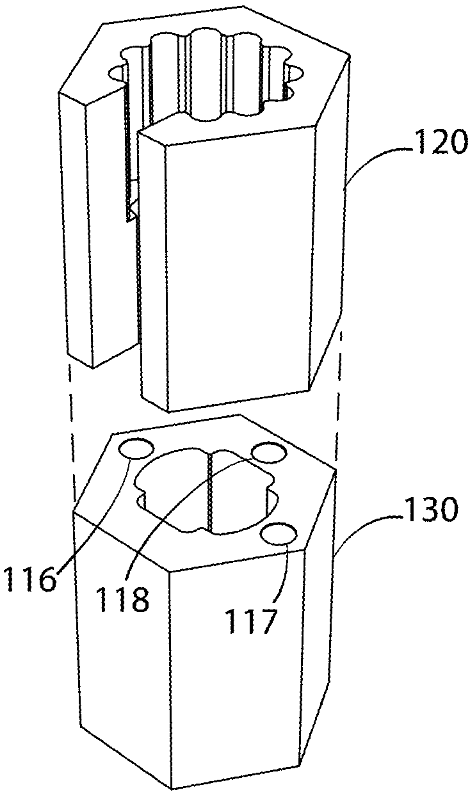

Referring to FIG. 17, one end of the end cap tool and one end of the main body tool may be structured to magnetically connect to reduce the chance of misplacing one or both of the end cap tool 120 and main body tool 130. FIG. 17 illustrates the end cap tool 120 stacked over and magnetically connected to the main body tool 130. FIG. 18 illustrates how the main body tool 130 and end cap tool 120 can be stacked in exploded view, showing magnet 116, magnet 117, and magnet 118. In FIG. 17, the end cap tool 120 and main body tool 130 are illustrated as having the same width and shape. This helps to accommodate stacking and is ergonomic to use.

Figure 19:
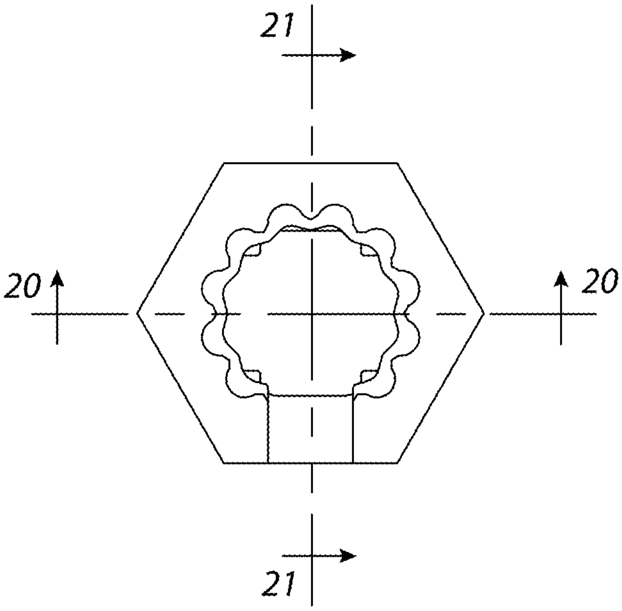
FIG. 19 illustrates, in top plan view, the electrical connector assembly tool of FIG. 17 showing section lines 20-20 and 21-21.
Figure 20:
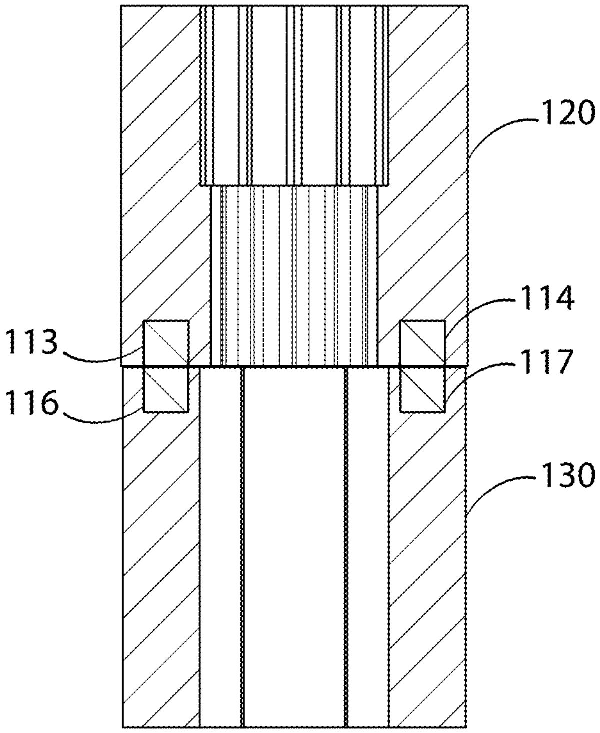
FIGS. 20 and 21 illustrate section views of the electrical connector taken along section lines 20-20 and 21-21 in FIG. 19, respectively.
Figure 21:
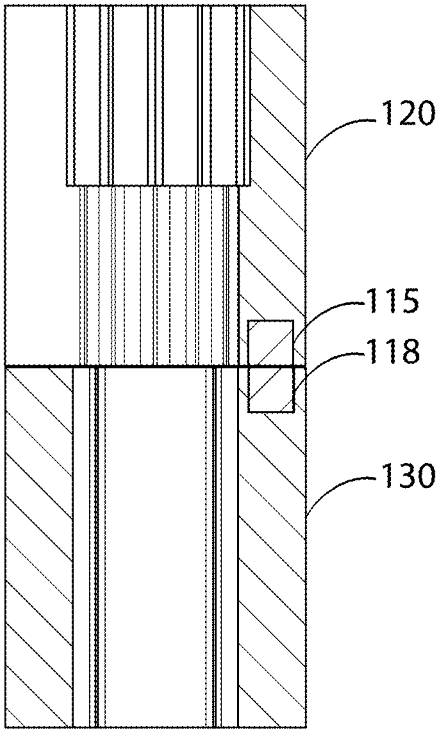

FIGS. 20 and 21 are section views of FIG. 19. Referring to FIGS. 20 and 21, magnets in the main body tool 130 and magnets the end cap tool 120 may be aligned to facilitate magnetic connection. For example, FIG. 20 illustrates magnet 113 and magnet 114 positioned within the end cap tool 120 aligned over magnet 116 and magnet 117, respectively in the main body tool 130. In FIG. 21, magnet 115 of the end cap tool 120 is aligned over magnet 118 in the main body tool 130. In FIGS. 20 and 21, the magnets are positioned so that the end cap tool 120 and the main body tool 130 coaxially align. Aligning magnets between the end cap tool 120 and the main body tool 130, allows the end cap tool 120 and the main body tool 130 to magnetically connect and secure to one another regardless of whether their bodies are made of magnetic or non-magnetic material. Examples of non-magnetic materials that may be suitable for the end cap tool 120 or the main body tool 130 of the electrical connector installation tool include aluminum, brass, thermoplastic, or high-nickel stainless steel. Additional examples of suitable non-magnetic materials, as well as magnetic materials, are described in the Conclusion and Variations section of this disclosure.

Figure 22:
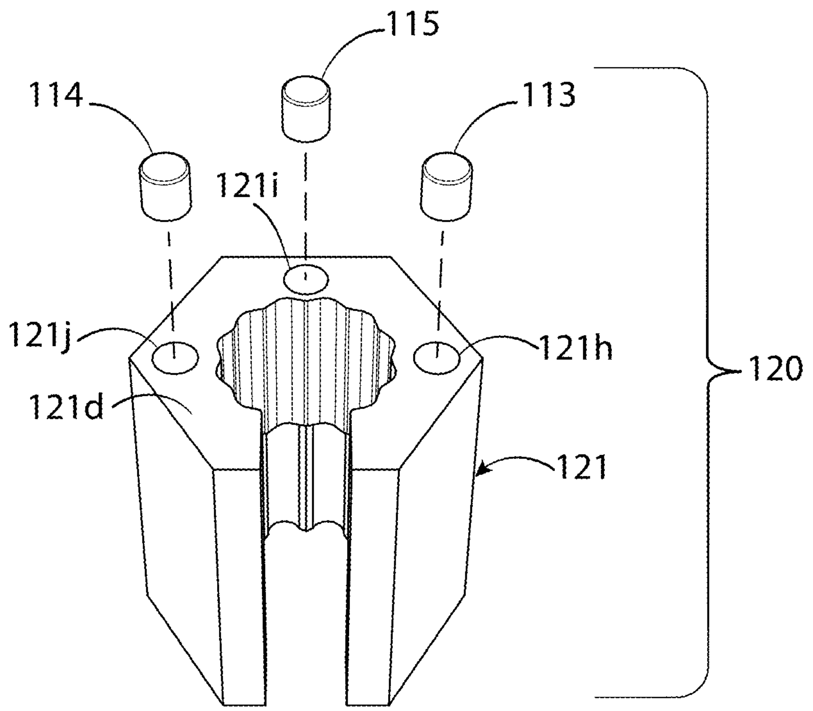
FIGS. 22 and 23, illustrate, in perspective view, magnets exploded away from the end-cap tool and main body tool, respectively.
Figure 23:
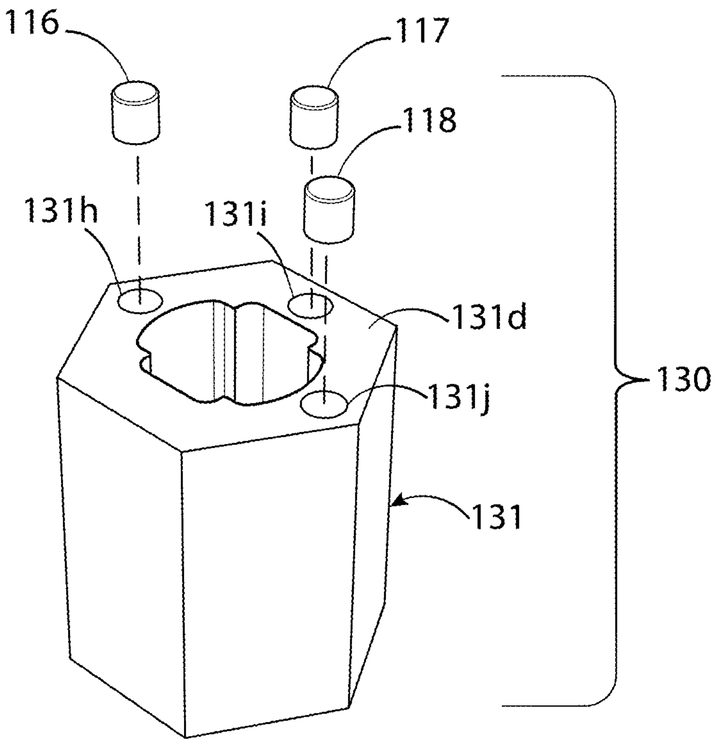

FIG. 22 illustrates aperture 121*h*, aperture 121*i*, and aperture 121*j*, in the top 121*d* of the end cap tool body 121 of the end cap tool 120. Aperture 121*h*, aperture 121*i*, and aperture 121*j*, are illustrated as blind holes. Magnet 113, magnet 115, and magnet 114 seat within aperture 121*h*, aperture 121*i*, and aperture 121*j*, respectively. FIG. 23 illustrates aperture 131*h*, aperture 131*i*, and aperture 131*j*, in the first end 131*d* of the tool body 131 of the main body tool 130. Aperture 131*h*, aperture 131*i*, and aperture 131*j*, may also be blind holes. Magnet 116, magnet 117, and magnet 118, seat within aperture 131*h*, aperture 131*i*, and aperture 131*j*, respectively.

In order to help facilitate hand gripping around the body of the end cap as described above, the end cap tool 120 may comprise a slotted tube as illustrated in FIGS. 5, 6, and 9-14. This slotted tube may be sized and shaped to be hand gripped around the outside of the tube, as illustrated in FIGS. 24-27. Similarly, the main body tool 130 may comprise a tube as illustrated in FIGS. 7, 8, 15, and 16. The tube may be sized and shaped to be hand gripped around the outside of the tube, as illustrated in FIGS. 24-27. The Inventor found that a hexagonally-shaped outside surface of the end cap tool or the main body tool helps accommodate hand gripping. For example, in FIGS. 25 and 27, the outer, middle, and inner portion of several fingers (the distal, middle, and proximal phalanxes) of the right hand 112, can grip three sides of the hexagonally shaped body. The fleshy portion of the right hand 112 between the thumb and index finger (the thenar) can grip two sides of the hexagonally shaped body. The lower portion of the thumb (proximal phalanx of the thumb) can grip the remaining side.

Assembly Example

The following is a discussion of a how an installer might use the electrical connector assembly to assemble the end cap to the main body of a solar electrical connector. Referring to FIG. 24, the installer may hold the end cap tool 120 in the right hand 112, and pass the electrical wire 102 through the slot-shaped opening 121*g* of the end cap tool 120. While grasping the electrical wire 102, with the left hand 111, the installer could move the end cap tool 120 toward the male connector 103, and seat the screw-on end cap 106 in the first end cap socket 121*b*.

Referring to FIG. 25, once the screw-on end cap 106 is seated in the end cap tool 120, the installer grasps the end cap tool 120 in the right hand 112, holds the main body tool 130 in the left hand 111, and firmly grips the electrical wire 102 with their right hand. While grasping the end cap tool 120, and the main body tool 130, the installer moves the main body 105 of the male connector 103 toward the main body socket 131*b*, of the main body tool 130. The installer seats a portion of the main body 105 inside the main body socket 131*b*. Referring to FIG. 26, the installer turns the end cap tool 120 with the right hand 112, while grasping and holding the main body tool 130 with the left hand 111, to screw the screw-on end cap 106 onto the main body 105. Note that the electrical wire 102, which is hidden from view is firmly gripped by the right hand and prevented from turning or twisting.

Figure 27:
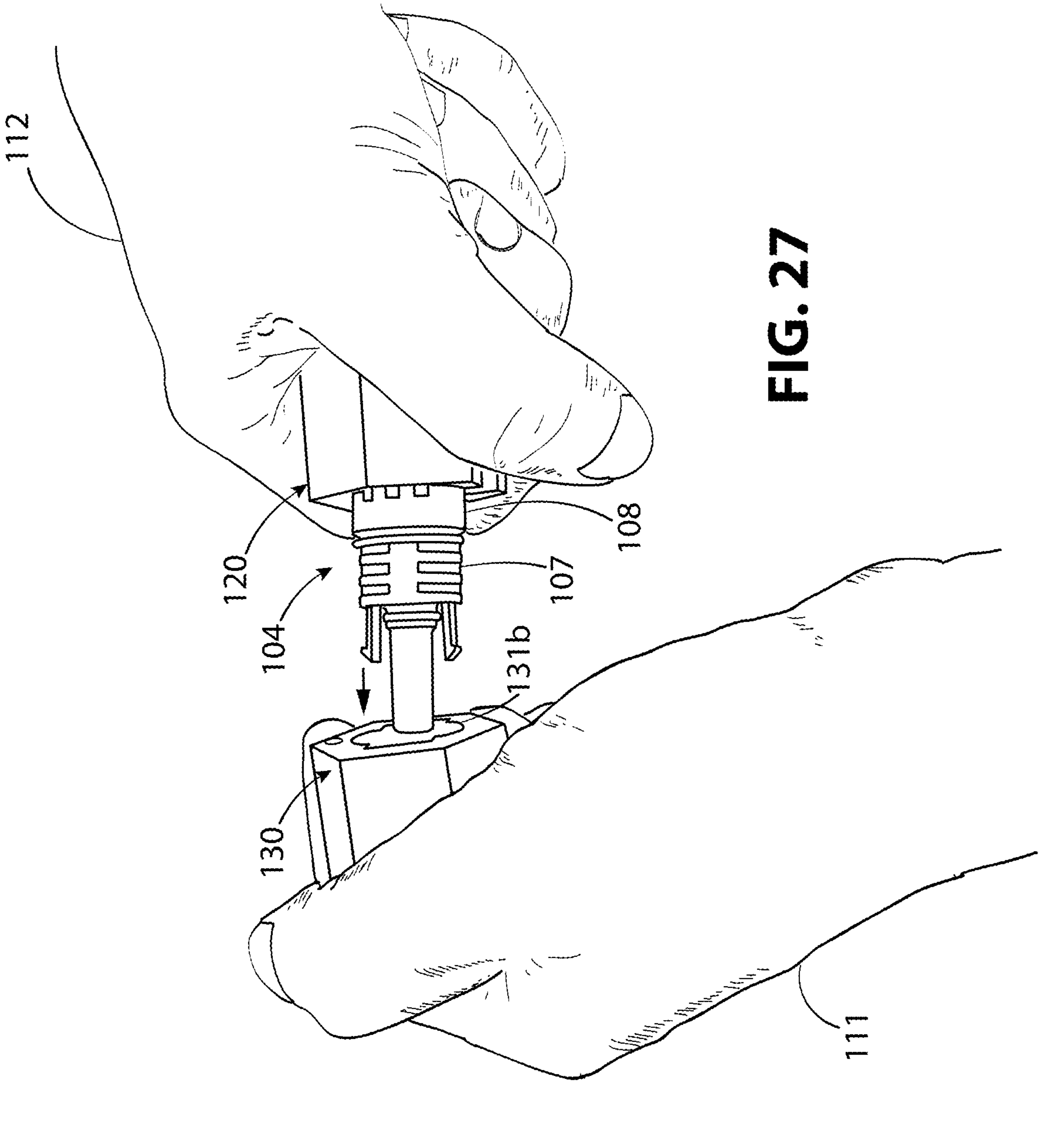

FIGS. 24-26 illustrates the procedure with a male connector 103. Referring to FIG. 27, the installer can follow a similar procedure for a female connector 104. For example, in FIG. 27, with the screw-on end cap 108 seated in the end cap tool 120, the installer grasps the end cap tool 120 with the right hand 112. With the main body tool 130 grasped in the left hand 111, the installer moves the main body 107 of the female connector 104 toward the main body socket 131*b* of the main body tool 130. The installer seats the main body 107 in the main body socket 131*b*. With the main body 107 seated in the main body socket 131*b*, the installer turns the end cap tool 120 clockwise to tighten the screw-on end cap 108, similar to what is shown in FIG. 26 for the male connector 103. As in FIG. 26, the electrical wire 102 is hidden from view, but firmly gripped by the right hand 112 of the installer to prevent movement.

CONCLUSION AND VARIATIONS

The Summary, Detailed Description, and figures describe an electrical connector installation tool for assembling electrical connectors. This disclosure provides examples of devices, components, and configurations to help the reader understand the described general principles. The following are examples of variations and combinations of different components, structures, and features of the electrical connector installation tool that still adhere to the general principles.

The discussion for FIGS. 24-26 described using the electrical connector installation tool to assemble the main body 105 to the screw-on end cap 106 of a male connector 103. The discussion of FIG. 27 described how an installer could use similar principles to assemble the screw-on end cap 106 to the main body 107 of a female connector 104. The discussion for FIGS. 24-27 described using the right hand 112 to grasp the end cap tool 120 and the electrical wire 102. FIGS. 25-27 described using the left hand 111 to grasp the main body tool 130. An installer may instead use the left hand 111 to grasp the end cap tool 120 and the electrical wire 102, and use the right hand 112 to grasp the main body tool 130 if that is their preference.

In FIGS. 25-27, any discussion of moving either the end cap tool 120 toward the main body tool 130 could be reversed so that the main body tool 130 is moved toward the end cap tool 120. For the discussion of FIGS. 26 and 27, the description of turning the end cap tool 120 while holding the main body tool 130 could be reversed. The installer could instead hold the end cap tool 120 and turn the main body tool 130.

In FIGS. 13 and 14, the end cap tool 120 was illustrated seating and engaging an MC4-type electrical connector and an H4-type electrical connector, respectively. The Multi-Contact Group, which is now Stäubli International AG, originally developed MC4 electrical connectors. Amphenol Corporation developed H4-type electrical connectors. Other manufacturers have developed MC4-type or MC4-like electrical connectors. Some of these connectors have the same size screw-on end caps as those manufactured by Stäubli, while others have larger screw-on end caps. For example, MC4-type electrical connectors manufactured under the tradename RENOGY by RNG International, Inc., have screw-on end caps similar in size as H4-type electrical connectors. Therefore, one of the advantages of sizing the first end cap socket 121*b*, and the second end cap socket 121*c*, to MC4-type and H4-type connectors, respectively, is that the tool can accommodate common variations in solar electrical connector screw-on end cap sizes. The first end cap socket 121*b*, and second end cap socket 121*c*, is not limited to the sizes and opening styles illustrated. Using the principles discussed in this disclosure, the Inventor envisions a first end cap socket and a second end cap socket, that can accommodate other solar panel connector styles that currently exist on the market or may exist in the future. For example, the first end cap socket 121*b* could be sized to accommodate an MC4-type screw-on end cap, while the second end cap socket 121*c* could be sized to accommodate a T4-type solar electrical connector. An example of a T4-type solar connector is manufactured by Than Solar Connectors.

As discussed earlier in this disclosure, the end cap tool 120 of FIGS. 5 and 8, and the main body tool 130 of FIGS. 7 and 8, are sized to be comfortably gripped by an installer. For example, a vertex-to-vertex width of 0.036 m (1.4 in.) is suitable for an average-sized hand. A width of 0.030 m (1.2 in.) to 0.040 m (1.57 in.) may also be suitable for comfortable gripping. The inventive concept is not limited by the size or width of the end cap tool 120 or main body tool 130.

In the discussion of hand gripping in the General Discussion, this disclosure highlighted some of the advantages of a hexagonal shape. While hand gripping overcomes described shortcomings of using a tool with a handle, there may be some instances when an installer would like to use a tool with a handle. With this in mind, an additional advantage of the hexagonal shape allows the installer to optionally use an open-end wrench, a twelve-point wrench, a twelve-point combination wrench, a socket wrench, or other tools that can grasp a hexagonal shape if they so choose.

While a hexagonal shape has ergonomic advantages, the Inventor envisions that other shapes could be used. For example, the outside surface of the end cap tool or the main body tool can be round or oval.

Examples within this disclosure have described the end cap tool as being a slotted tube and the main body tool as being a tube. As discussed in the definition section, for the purpose of this disclosure, a tube and slotted tube may be cylindrical or non-cylindrical. For example, the end cap tool 120 as shown in FIGS. 5 and 6 is a slotted-hexagonal prism with a hollow interior. The end cap tool body 121 as shown in FIGS. 7 and 8 is a hexagonal prism with a hollow interior. In accordance with this disclosure, a hexagonal prism with a hollow interior falls within the definition of tube. Likewise, a slotted-hexagonal prism with a hollow interior falls within the definition of a slotted tube.

In the discussion of FIG. 9, end cap sockets were illustrated as fluted with plurality of arc-shaped projections alternating with a plurality of arc-shaped indented surfaces. While the Inventor found that this type of fluting can readily accommodate solar electrical connectors, the Inventor envisions that the end cap sockets are not limited to fluting. They are not limited to having plurality of arc-shaped projections alternating with a plurality of arc-shaped indented surfaces. They are also not limited to having the shapes illustrated. For example, the plurality of arc-shaped projections or the plurality of arc-shaped indented surfaces could include a shallower or deeper arc. The plurality of arc-shaped projections could include a flat or planar outer-most surface. The plurality of arc-shaped indented surfaces could include a flat or planar inner-most surface. The end cap sockets could include a toothed pattern rather than the alternating arc-shaped projections and arc-shaped indented surfaces. Likewise, the end cap sockets could include a straight knurled pattern.

As previously discussed, the end cap tool body 121 of FIGS. 5 and 6 and the tool body 131 of FIGS. 7 and 8 can be made from various magnetic or non-magnetic materials. Examples of magnetic materials include galvanized steel or 430-type stainless steel. Examples of non-magnetic materials that may be suitable for the end cap tool body 121 and the tool body 131, include aluminum, brass, 316-type stainless steel, 304-type stainless steel, or various plastic materials. Examples of plastic material that may be suitable, include materials such as acrylonitrile butadiene styrene (ABS), nylon, glass filled nylon (such as XNGL), or UV-resistant materials such as high-density polyethylene (HDPE). The end cap tool body 121 and tool body 131 can be made from dual-durometer plastics. For example, a plastic material with a higher shore durometer (i.e. harder plastic) to engage the electrical connector, and a softer plastic forming the outer surface of the end cap tool body 121 and tool body 131 for better gripping. The end cap tool body 121 and tool body 131 could be made from a combination of metal and plastic. For example, the material engaging the electrical connector could be metal, such as aluminum, and the outer surface of the tool could be a medium soft plastic (i.e., medium shore durometer) for easy comfortable gripping and electrical insulation. Other non-magnetic materials or magnetic materials may be used, as long as they are suitable for use as a hand tool that tightens or loosens the end cap of the electrical connectors described and their equivalents.

Referring to FIGS. 5-8, the end cap tool body 121 (FIGS. 5 and 6) and the tool body 131 (FIGS. 7 and 8), may be manufactured by various manufacturing methods. For example, in FIGS. 7 and 8, the tool body 131 can be manufactured by extrusion with a secondary operation for drilling the blind holes for the magnets. Similarly, in FIGS. 5 and 6, the end cap tool body 121 can be manufactured by extrusion with secondary operations for drilling the blind holes for the magnets and a secondary operation to finish the first end cap socket 121*b* and the second end cap socket 121*c*. The end cap tool body 121 of FIGS. 5 and 6 and the tool body 131 of FIGS. 7 and 8, may also be cast, machined, or 3D printed.

FIGS. 10, 13 and 24 showed an example of a slot-shaped opening 121*g*. These figures illustrate an example of the slot-shaped opening's shape and proportion. The slot-shaped opening is not limited to the illustrated shape or proportion. Referring to FIG. 10, the slot-shaped opening 121*g* may be any proportion with respect to end cap tool body 121 or any shape that allows an electrical wire of the electrical connector cable assembly to pass through into the end cap tool body 121. For example, the slot-shaped opening could be wider or narrower in proportion to the end cap tool body 121. It could include parallel sides, as illustrated, or tapered-in sides, tapered-out sides, or arcuate sides.

The variations described, the general principles taught, and undescribed variations, devices, and systems that encompass the general principles described in this disclosure, are within the claim's scope.

The invention claimed is:

1. An electrical connector installation tool for assembling a solar electrical connector used in photovoltaic systems, the solar electrical connector, being a male solar electrical connector or a female solar electrical connector, and including a main body and a screw-on end cap threadedly fastenable to the main body, comprising:

an end cap tool includes a slotted tube with a top, a bottom, a first hollow interior, and a slot extending along the slotted tube from the top to the bottom and into the first hollow interior, the first hollow interior is sized and shaped to receive and turn the screw-on end cap of the solar electrical connector of a first size through the top and of a second size through the bottom; and a main body tool, separate from the end cap tool, the main body tool being a tube that includes a first end, a second end, and a second hollow interior, the second hollow interior is non-hexagonal, and is sized and shaped to engage and hold either of the main body of the male solar electrical connector and the main body of the female solar electrical connector through either of the first end and through the second end, and to prevent rotation of the main body while rotating the screw-on end cap using the end cap tool.

2. The electrical connector installation tool of claim 1, wherein the end cap tool includes an outside surface that is hexagonally shaped, and is sized to be hand gripped.

3. The electrical connector installation tool of claim 1, wherein the end cap tool includes a first end cap socket and a second end cap socket positioned at opposite ends of the first hollow interior, the first end cap socket and the second end cap socket are fluted.

4. The electrical connector installation tool of claim 1, wherein:

the end cap tool includes a first end cap socket and a second end cap socket positioned at opposite ends of the first hollow interior;

the first end cap socket includes a first plurality of arc-shaped projections alternating with a first plurality of arc-shaped indented surfaces; and the second end cap socket includes a second plurality of arc-shaped projections alternating with a second plurality of arc-shaped indented surfaces.

5. The electrical connector installation tool of claim 1, wherein the slotted tube and the tube are sized to be hand gripped and hand turned.

6. The electrical connector installation tool of claim 1, wherein:

the top of the end cap tool and the first end of the main body tool are securable to one another magnetically.

7. The electrical connector installation tool of claim 1, wherein:

the second hollow interior includes a first pair of keyways indented in first opposite surfaces of the second hollow interior and a second pair of keyways indented in second opposite surfaces of the second hollow interior, the first pair of keyways is positioned perpendicularly to the second pair of keyways, and the first pair of keyways and the second pair of keyways are sized and shaped to engage and hold the main body of the male solar electrical connector and the main body of the female solar electrical connector though the first end and through the second end.

8. The electrical connector installation tool of claim 1, wherein:

the second hollow interior includes a first pair of keyways indented in first opposite surfaces of the second hollow interior and a second pair of keyways indented in second opposite surfaces of the second hollow interior, the first pair of keyways and the second pair of keyways are sized and shaped to engage and hold the main body of the male solar electrical connector and the main body of the female solar electrical connector.

9. An electrical connector installation tool for assembling an electrical connector, the electrical connector including a main body and a screw-on end cap threadedly fastenable to the main body, comprising:

an end cap tool includes a slotted tube with a top, a bottom, and a first hollow interior, the first hollow interior is sized and shaped to receive and turn the screw-on end cap of the electrical connector through the top and through the bottom;

a main body tool, separate from the end cap tool, the main body tool includes a tube with a first end, a second end, and a second hollow interior, the second hollow interior is sized and shaped to engage and hold the main body of the electrical connector though the first end and through the second end;

the slotted tube and the tube are made of non-magnetic material;

a first plurality of magnets extending into the top of the slotted tube and a second plurality of magnets extending into the first end of the tube; and with the top of the slotted tube aligned over the first end of the tube, the first plurality of magnets are aligned with the second plurality of magnets.

10. An electrical connector installation tool for assembling a solar electrical connector used in photovoltaic systems, the solar electrical connector, being a male solar electrical connector or a female solar electrical connector, and including a main body and a screw-on end cap threadedly fastenable to the main body, comprising:

an end cap tool includes a slotted tube with a top, a bottom, a first hollow interior, and a slot extending along the slotted tube from the top to the bottom and into the first hollow interior, the first hollow interior is sized and shaped to receive and turn the screw-on end cap of the solar electrical connector of a first size through the top and of a second size through the bottom; and a main body tool, separate from the end cap tool, the main body tool being a tube, and being without a lengthwise slot, that includes a first end, a second end, and a second hollow interior, the second hollow interior is sized and shaped to engage and hold either of the main body of the male solar electrical connector and the main body of the female solar electrical connector through either of the first end and through the second end, and to prevent rotation of the main body while rotating the screw-on end cap using the end cap tool.

11. The electrical connector installation tool of claim 10, wherein the end cap tool includes a first end cap socket and a second end cap socket positioned at opposite ends of the first hollow interior, the first end cap socket and the second end cap socket are fluted.

12. The electrical connector installation tool of claim 10, wherein:

the end cap tool includes a first end cap socket and a second end cap socket positioned at opposite ends of the first hollow interior;

the first end cap socket includes a first plurality of arc-shaped projections alternating with a first plurality of arc-shaped indented surfaces; and the second end cap socket includes a second plurality of arc-shaped projections alternating with a second plurality of arc-shaped indented surfaces.

13. The electrical connector installation tool of claim 10, wherein:

the second hollow interior includes a first pair of keyways indented in first opposite surfaces of the second hollow interior and a second pair of keyways indented in second opposite surfaces of the second hollow interior, the first pair of keyways and the second pair of keyways are sized and shaped to engage and hold the main body of the male solar electrical connector and the main body of the female solar electrical connector.

* * * * *